United States Patent [19]
Chang

[11] Patent Number: 5,179,647
[45] Date of Patent: Jan. 12, 1993

[54] METHOD AND APPARATUS FOR IMPLEMENTING ADAPTIVE FORWARD DIFFERENCING USING INTEGER ARITHMETIC

[75] Inventor: Sheue-Ling L. Chang, Sunnyvale, Calif.

[73] Assignee: Sun Microsystem, Inc., Mountain View, Calif.

[21] Appl. No.: 295,117

[22] Filed: Jan. 9, 1989

[51] Int. Cl.$^5$ ............................................. G06F 15/62
[52] U.S. Cl. .................................... 395/142; 364/718; 364/747
[58] Field of Search ............... 364/518, 521, 718, 747, 364/577; 395/142

[56] References Cited

U.S. PATENT DOCUMENTS

| | | | |
|---|---|---|---|
| 4,061,907 | 12/1977 | Okamoto et al. | 364/718 |
| 4,225,936 | 9/1980 | Lesche | 364/718 |
| 4,371,933 | 2/1983 | Bresenham et al. | 364/300 |
| 4,586,037 | 4/1986 | Rosener et al. | 340/728 |
| 4,620,287 | 10/1986 | Yam | 364/518 |
| 4,631,690 | 12/1986 | Corthout et al. | 364/518 |
| 4,648,049 | 3/1987 | Dines et al. | 364/521 |
| 4,688,182 | 8/1987 | Schrieber | 364/523 |
| 4,730,261 | 3/1988 | Smith | 364/521 |
| 4,760,548 | 7/1988 | Baker et al. | 364/718 |
| 4,855,935 | 8/1989 | Lien et al. | 364/521 |

OTHER PUBLICATIONS

Fujimoto, Iwata, "Jag Free Images on a Raster CRT", *Computer Graphics Theory and Applications,* published 1983.

Field, "Incremental Linear Interpolation", *ACM Transactions on Graphics,* vol. IV, No. 1, Jan. 1985, pp. 1-11.

Swanson, Thayer, "A Fast Shaded Dash Polygon Renderer", *Computer Graphics,* vol. XX, No. 4, 1986.

Primary Examiner—Heather R. Herndon
Assistant Examiner—Mark K. Zimmerman
Attorney, Agent, or Firm—Blakely, Sokoloff, Taylor & Zafman

[57] ABSTRACT

A method and apparatus for implementing adaptive forward differencing technique in integer arithmetic resulting in an increase in precision while minimizing the number of mathematical operations to be performed is disclosed. The method and apparatus of the present invention provides for using a floating binary point adaptive forward differencing technique in which the binary point of the forward difference register, containing the value of the parametric function, is not shifted during parameter adjust-up and adjust-down operations. The binary point of the succeeding forward difference registers each containing a value corresponding to succeeding higher order derivatives of the parametric functions, are initially shifted a number of bits equal to a predetermined number of bits 'N' multiplied by a multiplication factor (referred to as guard bits) and the binary point is shifted to the right by one bit when an adjust-up operation is performed and to the left by one bit when an adjust-down operation is performed respectively reflecting the removal of a guard bit when an adjust-up operation is performed and the addition of a guard bit when an adjust-down operation is performed.

30 Claims, 8 Drawing Sheets

BINARY
POINT

BINARY
POINT

METHOD AND APPARATUS FOR IMPLEMENTING ADAPTIVE FORWARD DIFFERENCING USING INTEGER ARITHMETIC

BACKGROUND OF THE INVENTION

1. Field of the Invention

The present invention relates to methods and apparatus for evaluating a parametric function. More particularly, the present invention relates to methods and apparatus for the accurate rendering of higher order curves and curved surfaces represented by parametric functions on a CRT or other display.

2. Art Background

An effective way to represent curves and curved surfaces is through the use of parametric functions. Parametric functions are used in many applications areas such as seismic-geological and computer graphics. In the computer graphics area, parametric curves and curved surfaces are common functions which are used in the computer generation of surfaces and objects on a display such as, for example, in mechanical computer aided design ("MCAD") applications. Since high speed hardware designed for rendering curved lines and curved surfaces is usually done by subdividing and rendering them on a CRT as a plurality of straight-lines or planar polygons. One method of tessellating a curve or a curved surface into line segments or planar polygons is by using the technique of forward differencing. The x, y, and z coordinates of a curve are defined by three parametric functions of the form $f(t) = At^3 + Bt^2 + Ct + D$. In the forward differencing technique, the end points of the line segments which reside on the curve are determined by calculating the values of the parametric functions in constant parametric increments. In each cycle, the value of a function can be derived incrementally from the previous cycle by three additions performed using the coefficients of the forward difference basis representing the curve (a, b, c, d). The registers representing the storage of the coefficients, i.e., the a, b, c, and d registers, are illustrated in FIG. 1. (For further information on forward differencing, see Foley and Van Dam, *Fundamentals of Interactive Computer Graphics*, Addison Wesley, Reading MA, pp. 531-536).

Bartels, *Splines for use in Computer Graphics and Geometric Modeling* describes an improved method of implementing forward differencing technique using fixed point arithmetic for rendering parametric curves.

In the Bartels method, successive "guard bits" are identified in the forward difference registers containing the values of the coefficients of the curve represented in forward difference basis. The guard bits are identified as a predetermined number of least significant bits in the forward difference register. Referring to FIG. 2, for processing curves up to $2^n$ forward steps, n guard bits are used in the b, c, d forward difference registers successively. A forward step operation is performed with "n" guard bits truncated before adding a register to the adjacent register as illustrated by the following forward difference matrix and resulting equations.

$$\begin{bmatrix} d \\ c \\ b \\ a \end{bmatrix} \begin{bmatrix} 1 & 2^{-n} & 0 & 0 \\ 0 & 1 & 2^{-n} & 0 \\ 0 & 0 & 1 & 1 \\ 0 & 0 & 0 & 1 \end{bmatrix} \rightarrow \begin{cases} d' = d + (c >> n) \\ c' = c + (b >> n) \\ b' = b + a \\ a' = a \end{cases}$$

Where ">>n" represents that a right register shift of n bits and the constant $2^{-n}$ is a scale factor which indicates the shifting of the binary point to the left by n bits.

As a result, a portion of the error accumulated in the "b" register is truncated before added to the "c" register and a portion of the error accumulated in the "c" register is truncated before added to the "d" register. Thus the Bartels method provides greater precision than the traditional method as illustrated in FIG. 1 and the use of guard bits in the registers significantly increases the number of forward steps allowable in a 32 bit forward differencing technique by minimizing the error through the truncation of the guard bits.

In order to render higher order curves and surfaces, computer graphic systems typically are required to employ recursive subdivision methods which are expensive to implement in hardware because of high speed stack memory requirements and the increase in computational complexity over polygon rendering methods.

Adaptive forward differencing is an incremental technique which has been found to be useful in rendering higher order parametric curves and surfaces; see S. L. Lien, M. Shantz and V. Pratt, "Adaptive Forward Differencing for Rendering Curves and Surfaces", Computer Graphics, Vol. 21, No. 4, July 1987; M. Shantz and S. L. Chang, "Rendering Trimmed Nurbs with Adaptive Forward Differencing", Siggraph '88 proceedings, July 1988; and Shantz et al., U.S. patent application Ser. No. 047,696, filed May 8, 1987 for Method and Apparatus for Adaptive Forward Differencing in the Rendering of Curves and Surfaces. In the adaptive forward differencing technique, the parametric equation of the curve is transformed to an identical curve with a different parameterization, such that the size of the parametric increments is increased or decreased in order that the curve proceeds in substantially uniform increments such as approximately one pixel step on a display CRT. This differs from ordinary forward differencing in which the parametric increment is a constant and the step size is non uniform. Lien et. al. described a method in which the curve increment is decreased by dividing the parameter increment by two and increased by multiplying the parameter increment by two. This is implemented by multiplying the forward difference coefficients by an "Adjust Up" matrix "U" or an "Adjust Down" "D" matrix prior to multiplying the coefficients by the forward step or "forward difference" matrix which determines the next point along the curve:

$$U = \begin{bmatrix} 1 & 0 & 0 & 0 \\ 0 & 2 & 1 & 0 \\ 0 & 0 & 4 & 4 \\ 0 & 0 & 0 & 8 \end{bmatrix} \rightarrow \begin{cases} d' = d \\ c' = (c << 1) + b \\ b' = (a + b) << 2 \\ a' = a << 3 \end{cases}$$

-continued $$D = \begin{bmatrix} 1 & 0 & 0 & 0 \\ 0 & \frac{1}{4} & \frac{1}{4} & 1/16 \\ 0 & 0 & \frac{1}{4} & \frac{1}{4} \\ 0 & 0 & 0 & \frac{1}{4} \end{bmatrix} \rightarrow \begin{cases} d' = d \\ a' = a >> 3 \\ b' = (b >> 2) - a' \\ c' = (c - b') >> 1 \end{cases}$$

Klassen, "Antialiasing Cubic Splines", submitted to ACM TOG for publication, July 1988, expanded the concept of adaptive forward differencing by employing guard bits in the process. More specifically Klassen modified the adjust-up matrix and the adjust-down matrix to incorporate the usage of guard bits in the adaptive forward difference (AFD) registers (b, c, and d) and to vary the number of guard bits in the b, c, d registers after each adjustment operation such that one guard bit is added after an adjust down operation (illustrated in FIG. 3b), and one guard bit is eliminated after an adjust up operation (illustrated in FIG. 3a) giving the effect of a floating binary point in the registers. This is implemented using the adjust-up matrix Uk and adjust-down matrix Dk and the resulting equations shown below:

$$U_k = \begin{bmatrix} \frac{1}{2} & 0 & 0 & 0 \\ 0 & \frac{1}{2} & 2^{-n-2} & 0 \\ 0 & 0 & \frac{1}{2} & 1/2 \\ 0 & 0 & 0 & 1 \end{bmatrix} \rightarrow$$

$$\begin{cases} d' = d >> 1 \\ c' = (c >> 1) + (b >> (n + 2)) \\ b' = (a + b) >> 1 \\ a' = a \\ \text{and } n' = n - 1 \end{cases}$$

$$D_k = \begin{bmatrix} 2 & 0 & 0 & 0 \\ 0 & 2 & -2^{-n} & 2^{-n-1} \\ 0 & 0 & 2 & -1 \\ 0 & 0 & 0 & 1 \end{bmatrix} \rightarrow$$

$$\begin{cases} d' = d << 1 \\ b' = (b << 1) - a \\ c' = (c << 1) - b(b' >> (n + 2)) \\ a' = a \\ \text{and } n' = n + 1 \end{cases}$$

However, in Klassen's process the binary point of the "d" register is varied. This point is critical because in the hardware implementation of AFD the d register accumulates the result of the forward step calculation which is output from the AFD circuit and is determinative of the next point along the curve. Thus, the precision of the calculation is dependent upon the number of fractional bits in the d register. This problem is particularly evident when the parametric increment is adjusted severely upward and the registers are shifted so far to the left that a minimal number of fractional bits remain. In addition, the format of the output is not constant because the format is dependent upon the number of adjust-up and adjust-down operations which have occurred. Thus the hardware which interfaces with AFD hardware is further complicated with circuitry to accommodate inputs having a floating binary point.

SUMMARY OF THE INVENTION

It is therefore an object of the present invention to provide a method and apparatus for Integer Adaptive Forward Differencing employing a floating binary point which provides for a high precision output regardless of the number of adjust-up and adjust-down operations.

It is further an object of the present invention to provide a method and apparatus for floating binary point adaptive forward differencing in which the output is consistent in a 16.16 fract-format generally used to execute integer instructions in digital computer systems.

It is also an object of the present invention to a method and apparatus which minimizes the number of mathematical operations required to perform an adjust-up and adjust-down operation in the adaptive forward differencing process.

The method and apparatus of the present invention provides for using a floating binary point adaptive forward differencing technique in which the binary point of "d" register, containing the value of "d" coefficient of the forward differencing basis, is not shifted during parameter adjust-up and adjust-down operations. The binary point of the a, b, c coefficient registers of the parametric equation are initially shifted n bits (i.e. the register contains "n" guard bits) and the binary point is shifted to the right when an adjust-up operation is performed and to the left when an adjust-down operation is performed respectively reflecting the removal of a guard bit when an adjust-up operation is performed and the addition of a guard bit when an adjust-down operation is performed.

DETAILED DESCRIPTION OF THE INVENTION

In the method and apparatus of the present invention, the adaptive forward differencing technique is utilized to compute values of a polynomial parametric function which is typically in the form $f(t) = At^3 + Bt^2 + Ct + D$. Although the invention is described with respect to a third order function, the concepts may be easily applied to different order parametric functions. The parametric function is first converted to forward difference basis using known techniques, such as that described in Foley and Van Dan, *Principles of Interactive Graphics*, pp 531–536. The coefficients of the parametric function in forward difference basis, a, b, c and d, are stored in registers (referred to as the "a", "b", "c" and "d" registers) and operated on to generate the values of the parametric equation.

Figure 1:
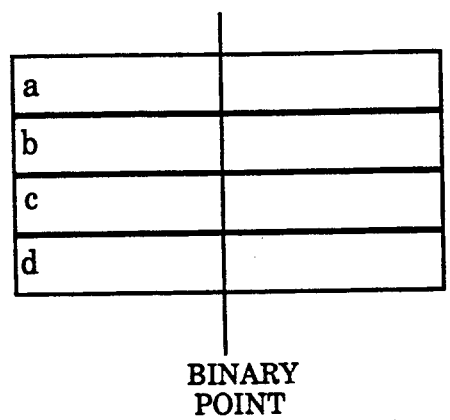
FIG. 1 illustrates the alignment and integer format of the registers in the prior art method of forward differencing.
Figure 2:
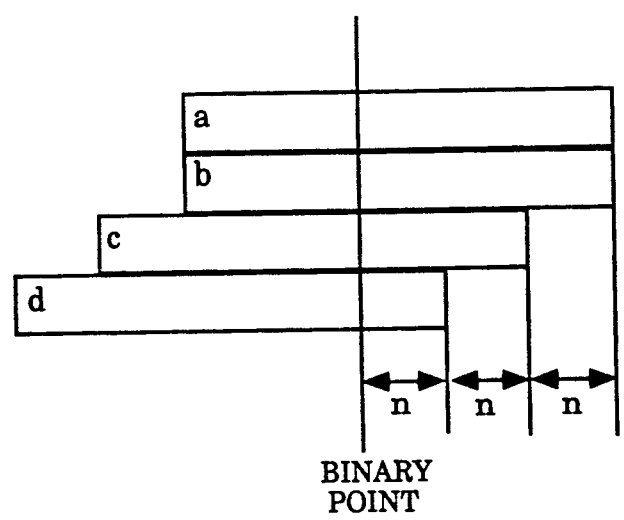
FIG. 2 illustrates the alignment and integer format of the registers in the Bartel's prior art method of forward differencing.
Figure 3A:
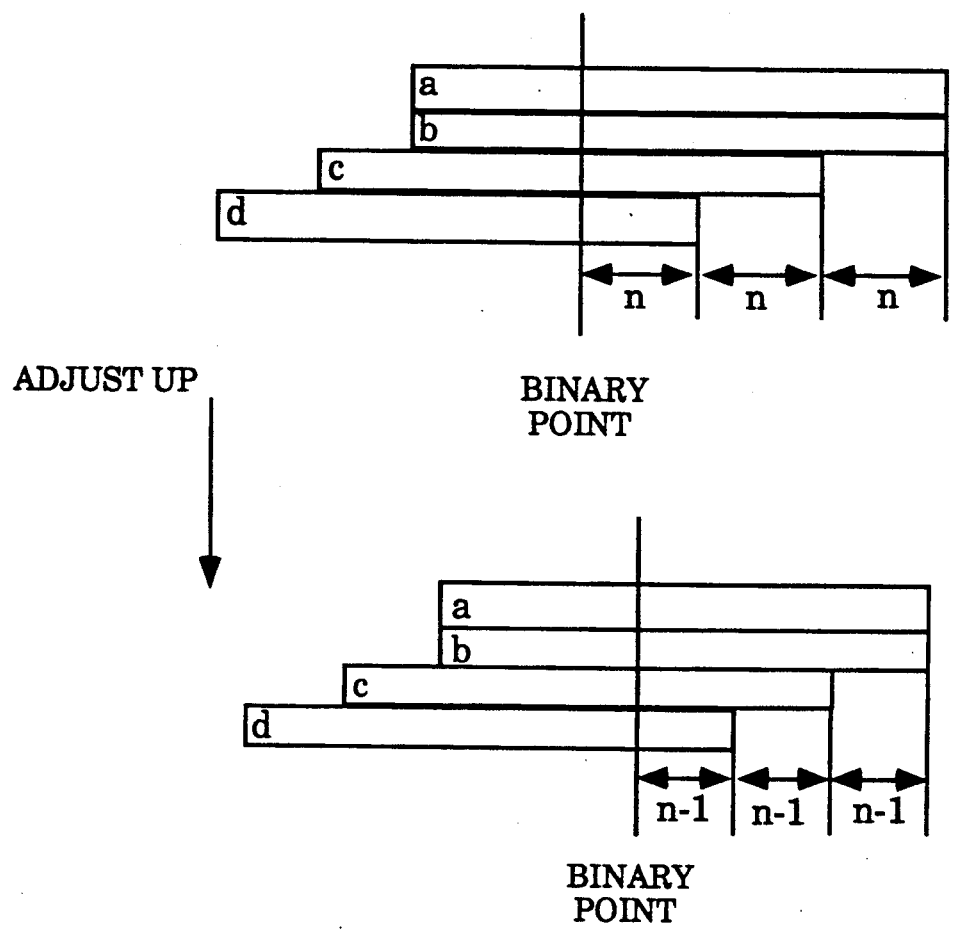
FIG. 3(a) and 3(b) illustrate the alignment and format of the register's in Klassen's prior art method of adaptive forward differencing.
Figure 3B:
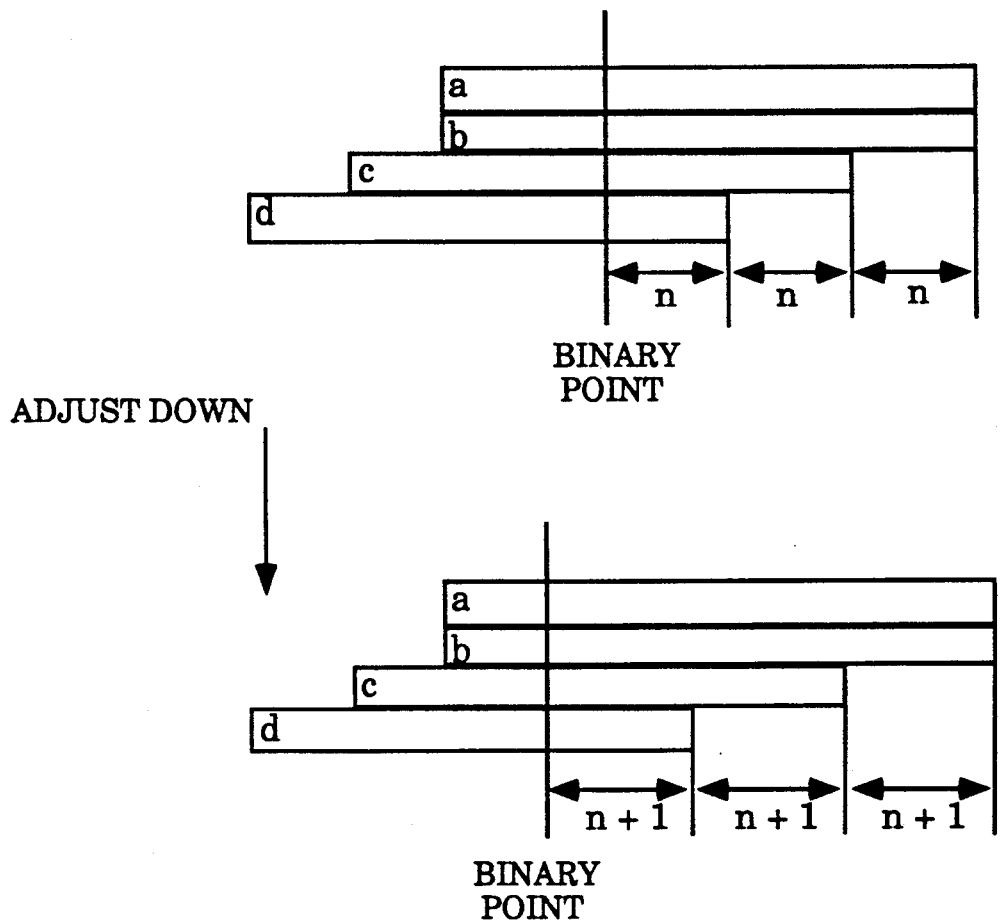
Figure 4A:
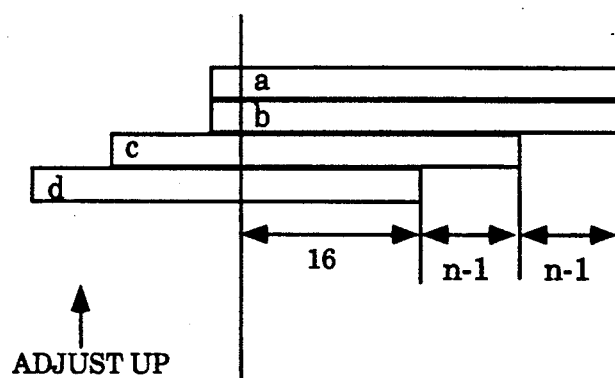
FIG. 4(a), 4(b), 4(c) illustrate the movement of the binary point in the registers containing the coefficients in the method and apparatus of the present invention.
Figure 4B:
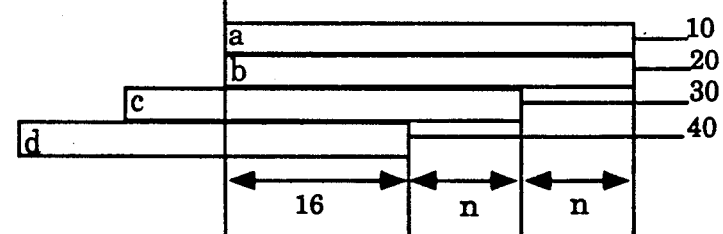

Referring to FIG. 4b, the binary points of each of the a, b, c and d registers, 10, 20, 30 and 40, are located such that the c register 30 is shifted "n" bits to the right of the d register 40 and the a and b registers 10, 20 are shifted n bits to the right of the c register 30 and 2n bits to the right of the d register 30. The number n, called "tessellation number", which is determinative of the number of guard bits, indicates the current level of subdivision which is related to the instant velocity of a curve at the current position along the curve. Preferably, the value of the initial tessellation number n is set by the user. A user may calculate the initial tessellation number by computing the magnitude of the first order derivative at the beginning point of a curve. Thus, it can be said that the a and b registers 10, 20 contain 16+2n fractional bits, the c register 30 contains 16+n fractional bits and the d register 40 contains 16 fractional bits.

Figure 4C:
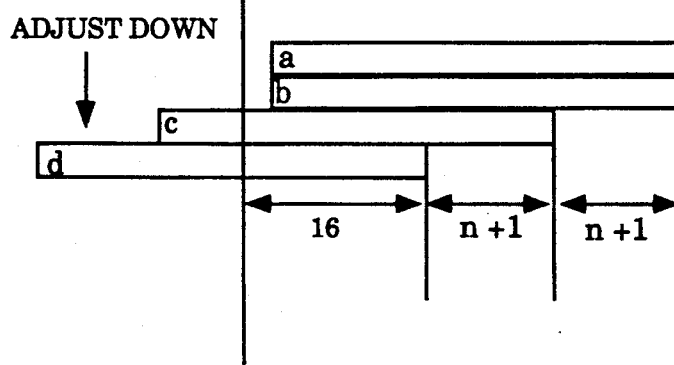

If an adjust-up operation is performed to double the parametric increment, the value n is decremented by one and the binary point of the a, b and c registers 10, 20, 30 are accordingly right shifted by one as illustrated in FIG. 4a. Thus, the result is that the a and b registers 10, 20 contain 16+2(n−1) fractional bits, the c register 30 contains 16+(n−1) fractional bits, and the d register 40 maintains 16 fractional bits. Similarly if an adjust-down operation is performed to halve the parameter increment, the binary point of the a, b, c registers 10, 20 and 30 accordingly are left shifted by one as illustrated in FIG. 4c. The result is that the a, b, c and d registers 10, 20, 30 and 40 contain 16+2(n+1), 16+2(n+1), 16+(n+1), and 16 fractional bits respectively.

It should be noted that the binary point of the d register 40 is not shifted during the adjust-up and adjust-down operations. Thus the output of the AFD circuit after the forward step operation is maintained in a constant format. Preferably the binary point of the d register 40 is maintained between the 16 most significant bits and 16 least significant bits such that the output of the circuit is a fixed point 16·16 fract-format, a compatible format which is most frequently used in applications operated in integer arithmetic.

Figure 5A:
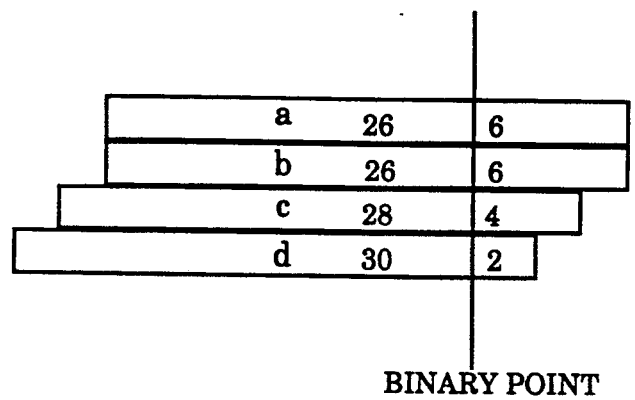
FIG. 5(a) illustrates the status of the coefficient registers after a plurality of adjust-up operation using Klassen's prior art technique.
Figure 5B:
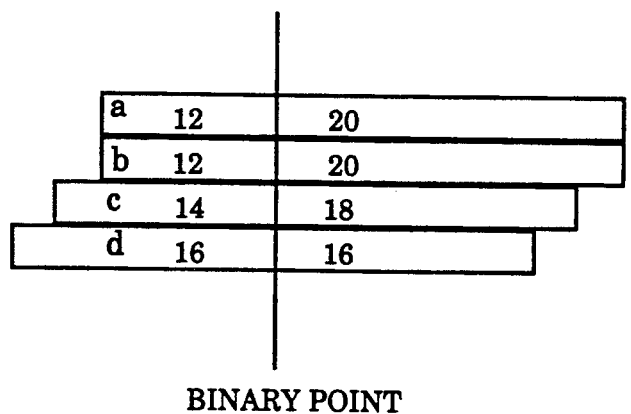
FIG. 5(b) illustrates the status of the coefficient registers using the method and apparatus of the present invention.

One of the advantages of maintaining the output in a fixed format is illustrated in FIG. 5. FIG. 5 is exemplary of the status of the 32 bit registers when a number of adjust-up operations occur. FIG. 5a is illustrative of the process described by Klassen when the velocity of the curve at the current point is approximately $2^2$ and a number of adjust-up operations have occurred. For example, FIG. 5a may reflect the status of the registers if the original tessellation number was 10 and 8 adjust operations have occurred. FIG. 5b is illustrative of the status of the a, b, c and d registers using the method and apparatus of the present invention. While only 6 fractional bits are maintained in the register using Klassen's method, 20 bits are maintained in the a register and a constant 16 fractional bits are maintained in the d register using the method and apparatus of the present invention. Thus, the method and apparatus of the present invention provides a much greater precision than prior art methods.

Utilizing the method and apparatus of the present invention, the adjust-up operation is realized by multiplying the forward difference coefficients a, b, c and d by the matrix [Uc]:

$$Uc = \begin{bmatrix} 1 & 0 & 0 & 0 \\ 0 & 1 & -2^{-n-1} & 0 \\ 0 & 0 & 1 & 1 \\ 0 & 0 & 0 & 2 \end{bmatrix} \rightarrow \begin{cases} d' = d \\ c' = c + b >> (n+1) \\ b' = b + a \\ a' = a << 1 \\ n' = n - 1 \end{cases}$$

Wherein the value of n is decremented by one and results in a set of new coefficients a', b', c' and d'; "b >> (n+1)" is representative of the right shift of the contents in b register by n+1 bits and "a << 1" is representative of the left shift of the contents of the "a" register by one bit.

Similarly the adjust-down operation is realized by the multiplication of the forward difference coefficients a, b, c and d by the matrix [Dc]:

$$Dc = \begin{bmatrix} 1 & 0 & 0 & 0 \\ 0 & 1 & -2^{-n-2} & 2^{-n-3} \\ 0 & 0 & 1 & -\frac{1}{2} \\ 0 & 0 & 0 & 1 \end{bmatrix} \rightarrow \begin{cases} a' = a >> 1 \\ b' = b - a' \\ c' = c - (b' >> (n+2)) \\ d' = d \\ n' = n + 1 \end{cases}$$

Wherein the value of n is incremented by one and results in a set of new coefficients a', b', c' and d'.

The forward step operation is performed similarly to the ordinary forward differencing technique by the multiplication of the forward difference coefficients a, b, c and d by the matrix [Fc]:

$$Fc = \begin{bmatrix} 1 & 2^{-n} & 0 & 0 \\ 0 & 1 & 2^{-n} & 0 \\ 0 & 0 & 1 & 1 \\ 0 & 0 & 0 & 1 \end{bmatrix} \rightarrow \begin{cases} \text{output: } (d >> 16) \\ d' = d + (c >> n) \\ c' = c + (b >> n) \\ b' = b + a \end{cases}$$

Wherein the value of n is unchanged, the binary point of the registers are unchanged and a new set of coefficients b', c' and d' are generated which are determinative of the next step along the curve.

Another advantage of the method and apparatus of the present invention is realized by the comparison of the adjust-up and adjust-down matrices of Klassen, Uk, Dk and the adjust-up and adjust-down matrices of the present invention Uc and Dc. The matrices utilized in the method and apparatus of the present invention employ fewer operations and therefore requires less computational overhead and expense.

As stated earlier, the method and apparatus of the present invention may be utilized in a variety of applications which employ the computing of the values of parametric functions. However, it is preferred that this is applied to the rendering of curves and surfaces in computer generated images, i.e. computer graphics. In this regard, the use of the Integer Adaptive Forward Differencing technique in the rendering of curves will be described below.

Figure 6:
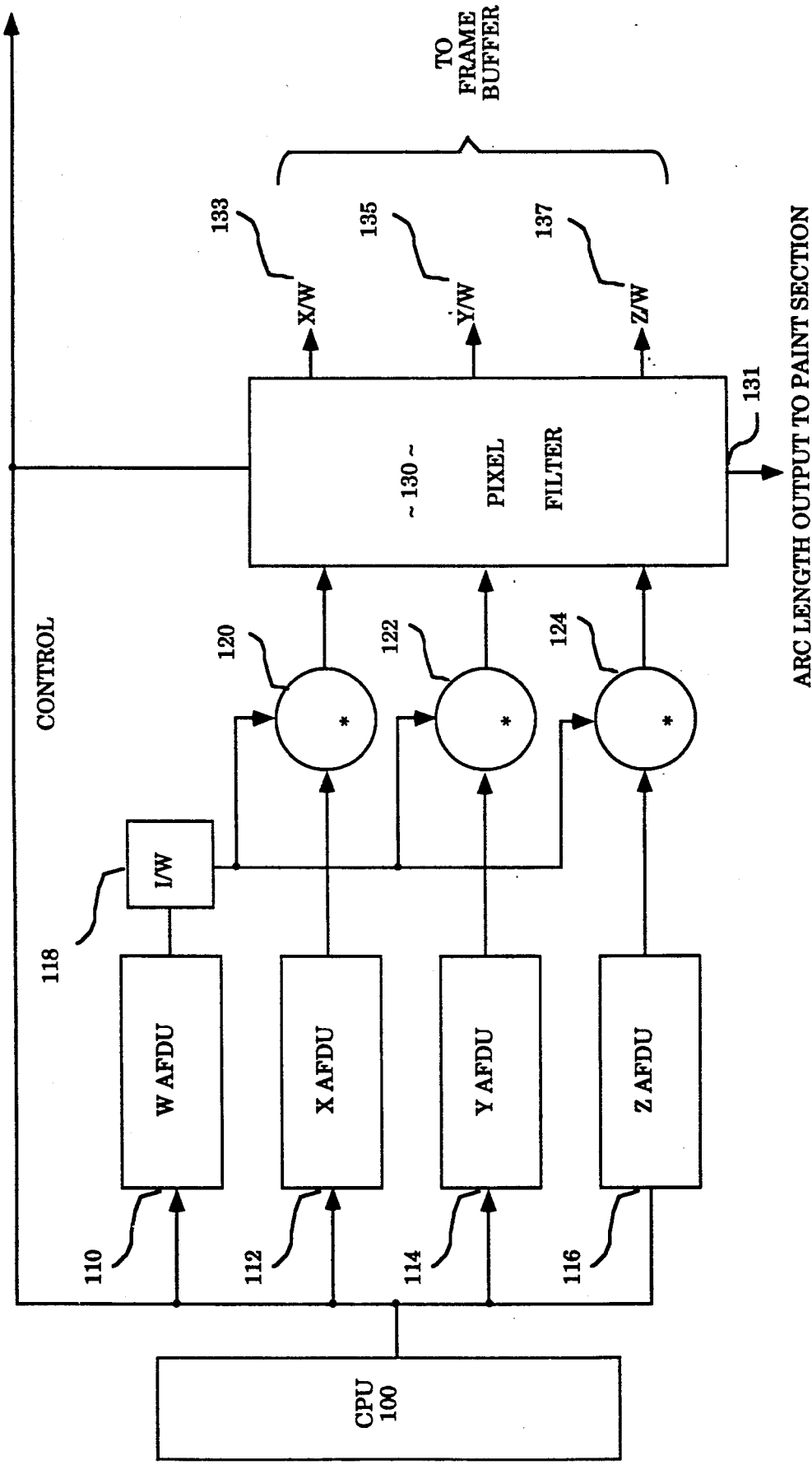
FIG. 6 illustrates a preferred embodiment of the present invention utilized to render curves in single pixel increments.

FIG. 6 illustrates an overall block diagram view of the system to render curves and surfaces using the integer adaptive forward differencing method of the present invention. In order to define images on a CRT display or other display device, it is necessary to manipulate data at a high speed in order to select the pixels of a CRT display that define the curve, curved surface, vector or image that is desired to be displayed. It is known that the location of each point to be displayed on a CRT is typically represented by digital values stored in a memory device which correspond to x, y, z and w homogenous coordinates.

The coefficients of the equations describing curves to be rendered by the system of FIG. 6 are calculated and supplied by a CPU 100 and are transmitted to the W, X, Y, and Z Adaptive Forward Differencing Unit ("AFDU") circuits 110, 112, 114 and 116 which, in response, output w, x, y, and z coordinates, respectively, for each pixel to be drawn on the display. The w coordinate outputted by the W AFDU circuit 110 is coupled to the 1/w circuit 118 which, in turn, outputs the current value of 1/w. The x, y and z coordinates are divided by the homogenous coordinate w (i.e. multiplied by the current reciprocal value in order to obtain the ratio of two cubic functions), by the 1/w circuit 118 and the three multipliers 120, 122, and 124.

More specifically, the X AFDU circuit 112 outputs the current x coordinate to a multiplier 120, wherein it is multiplied by the corresponding 1/w value outputted by the 1/w circuit 118, such that a current x/w value is supplied to pixel filter 130. In a similar fashion, y/w and z/w are supplied to pixel filter 130, respectively, by W, Y and Z AFDU circuits 110, 114, and 116, 1/w circuit 118 and by the multipliers 122 and 124. In this fashion the x, y, and z coordinates of the rational cubic functions are inputted to pixel filter 130 and used to select the pixels defining images of the rational cubic functions on a CRT.

The pixel filter 130 of FIG. 6 compares the current x, y and z coordinates, which are input to the pixel filter 130 by multipliers 120, 122, and 124, with the x, y and z coordinates, which were input to the pixel filter 130 one clock cycle previously, and instructs the W, X, Y and Z AFDU circuits to "adjust-up" (i.e., advance the curve or curved surface in larger increments) or to "adjust-down" (i.e., advance the curve or curved surface in smaller increments) or to "step forward" to the next pixel by performing a "forward-step operation" utilizing the matrix [Fc] such that the x, y and z coordinates outputted by pixel filter 130 advance along the curve being displayed on the CRT substantially single pixel increments. The adjust up operation is performed by multiplying the forward difference coefficients in the a, b, c and d registers by [Uc] matrix and the adjust down operation is performed by multiplying the forward difference coefficients in the a, b, c and d registers by [Dc] matrix.

The pixel filter 130 is coupled, at outputs 133, 135, and 137, to frame buffer (not shown) which, in turn, is coupled to a CRT display (also not shown) or other appropriate display device, for defining images by enabling, or writing a color value at the pixels defined by the pixel coordinates outputted by pixel filter 130 at outputs 133, 135 and 137. Furthermore, arc length output 131 of pixel filter 130 is coupled to a paint section (not shown) which paints pixels in accordance with the arc length value outputted by pixel filter 130 at output 131. The arc length value is employed in the drawing of textured (dashed, dotted, etc.) lines and surfaces.

Each AFDU circuit calculates a parametric cubic function f(t) represented as:

$$f(t) = aB_3(t) + bB_2(t) + cB_1(t) + dB_0(t)$$

Figure 7:
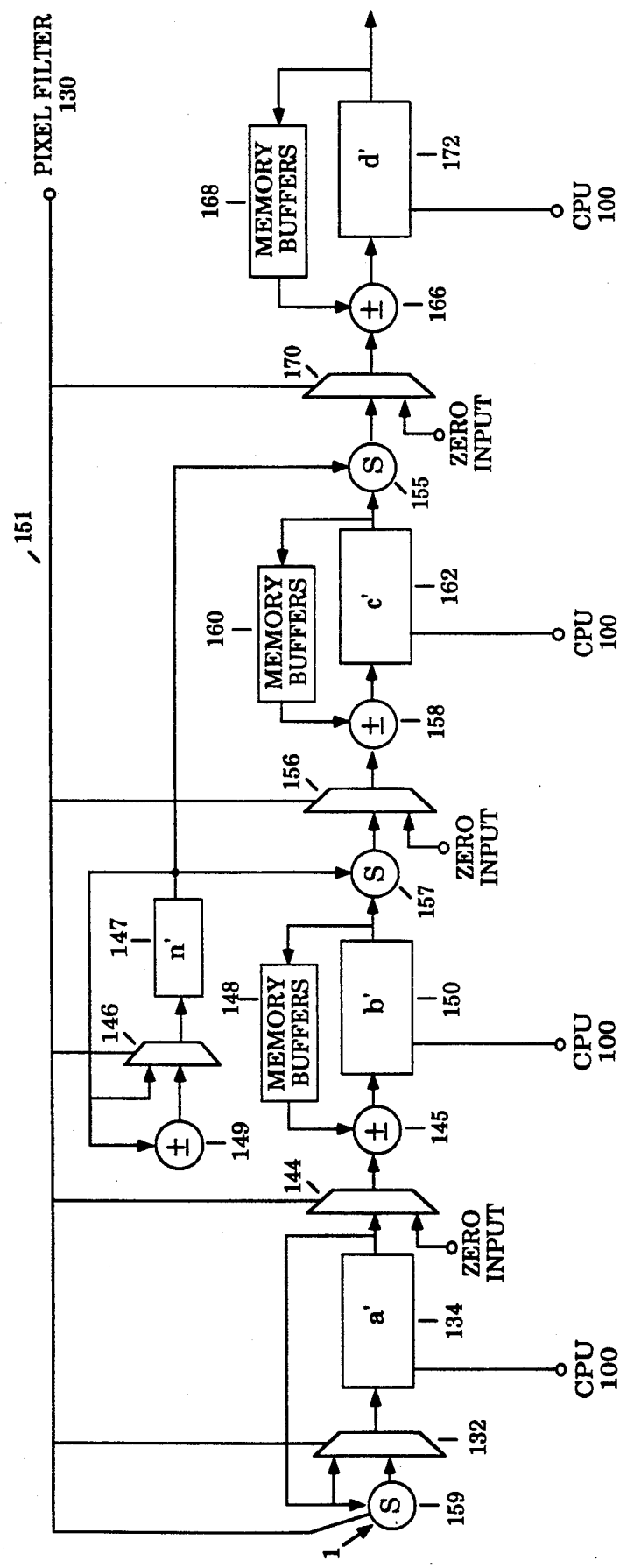
FIG. 7 illustrates the organization of the elements used to perform the adjust-up, adjust-down and forward operations in the preferred embodiment of the present invention.

For each x, y, z and w coordinate the parametric cubic function f(t) is:

$$x(t) = a_x B_3(t) + b_x B_2(t) + c_x B_1(t) + d_x B_0(t)$$

$$y(t) = a_y B_3(t) + b_y B_2(t) + c_y B_1(t) + d_y B_0(t)$$

$$z(t) = a_z B_3(t) + b_z B_2(t) + c_z B_1(t) + d_z B_0(t)$$

$$w(t) = a_w B_3(t) + b_w B_2(t) + c_w B_1(t) + d_w B_0(t)$$

x(t), y(t), z(t) and w(t) are respectively calculated in the X AFDU circuit 112, Y AFDU circuit 114, Z AFDU circuit 116 and W AFDU 110. FIG. 7 is a block diagram representative of the X AFDU circuitry 112 of FIG. 6. Y, Z and W AFDU circuits 114, 116 and 110 are identical in circuitry to the X AFDU circuit 112, and therefore a thorough understanding of X AFDU circuit 112 will also fully convey the circuitry and operation of Y, Z and W AFDU circuits 110, 114 and 116.

The above functions $B_3(t)$, $B_2(t)$, $B_1(t)$ and $B_0(t)$ are forward difference basis functions. These functions are usually defined as t varies from 0 to 1 along a curve. The dt step size or parameter increment for t is automatically adjusted so that the curve is incremented according to a predetermined heuristic function. For example, the parameter increment may be adjusted such that the curve is incremented in substantially uniform amounts or more specifically, single pixel steps. To simplify the explanation of the system, the heuristic in which the curve is incremented in single pixel step is used. However it is evident that any heuristic may be used.

The four forward difference basis functions $B_3(t)$, $B_2(t)$, $B_1(t)$ and $B_0(t)$ are listed below:

$$B_3(t) = \frac{t^3 - 3t^2 + 2t}{6}$$

$$B_2(t) \frac{t^2 - t}{2}$$

$$B_1(t) = t$$

$$B_0(t) = 1$$

The coefficients of the integer adaptive forward differencing function a, b, c and d are initially calculated by CPU 100 as follows:

$$d = D$$

$$c = C + ((B + (A >> n)) >> n)$$

$$b = 2B + (6A >> n)$$

$$a = 6A >> n$$

The values A, B, C and D are the coefficients of the cubic polynomial function. The integer "n" is referred to as the tessellation number or the level of subdivision and reflects a value input by the user. The tessellation number n indicates that a parametric curve can be tessellated into $2^n$ number of segments using equal parametric increments at $2^{-n}$ spacing. The notations "$<<$" and "$>>$" represent a left shift and a right shift. For example, the notation "$A>>n$" indicates that data A is right shifted by n bits.

The coefficients a, b, c, d and the tessellation number n are loaded into the four coefficient registers 134, 150, 162, 172 and tessellation register 147 of each AFDU circuit at initialization by the CPU 100. At each clock cycle, the parameter t increases by dt and the four coefficients are updated to a', b', c', d' while the four AFDU circuits 110, 112, 114 and 116 generate the coordinates of the next point which correspond to a particular pixel on the CRT display.

If the x, y coordinate currently calculated by the X and Y AFDU circuits 112 and 114 define a pixel location on the CRT display which is more than a single pixel increment from the previously defined pixel, then pixel filter 130 instructs each AFDU circuit to divide the parametric increment dt by two (adjust down), thereby reducing the x, y increments so that at each clock cycle each AFDU circuit outputs coordinates which define pixels along the curve in approximately single pixel increments. In a similar fashion, if the x, y address step is less than a ½ pixel increment from the previously defined pixel, then the parametric increment dt is doubled (adjusted up) to increase the change in the x, y coordinates such that again approximately one pixel step is incremented at each clock cycle. To reduce dt by half, the cubic functions x(t), y(t), z(t), w(t) are transformed as follows:

$$x'(t)=x(t/2)=a'_xB_3(t)+b'_xB_2(t)+c'_xB_1(t)+d'_xB_0(t)$$

$$y'(t)=y(t/2)=a'_yB_3(t)+b'_yB_2(t)+c'_yB_1(t)+d'_yB_0(t)$$

$$z'(t)=z(t/2)=a'_zB_3(t)+b'_zB_2(t)+c'_zB_1(t)+d'_zB_0(t)$$

$$w'(t)=w(t/2)=a'_wB_3(t)+b'_wB_2(t)+c'_wB_1(t)+d'_wB_0(t)$$

Coefficients of the transformed set of cubic functions are given by:

$$a'=a>>1$$

$$b'=b-(a>>1)$$

$$c'=c-((b-(a>>1))>>(n+2))$$

$$n'=n+1$$

In order to double dt, the coordinate cubic functions are transformed by:

$$x'(t)=x(2t)$$

$$y'(t)=y(2t)$$

$$z'(t)=z(2t)$$

$$w'(t)=w(2t)$$

In the case of doubling dt, the method of the present invention utilizes the following coefficient transformation:

$$c'=c+(b>>(n+1))$$

$$b'=b+a$$

$$a'=a<<1$$

$$n'=n-1$$

If the current step size being used by the AFDU circuits is approximately a one pixel increment, then the AFDU circuits generate coordinates corresponding to a new pixel and step forward to that pixel by performing the following transformation:

$$x'(t)=x(t+1)$$

$$y'(t)=y(t+1)$$

$$z'(t)=z(t+1)$$

$$w'(t)=w(t+1)$$

and the corresponding coefficient transformation for an increment of one pixel is:

$$a'=a$$

$$b'=b+a$$

$$c'=c+(b>>n)$$

$$d'=d+(c>>n)$$

Returning to FIG. 7, in order to implement the above transformations (adjust-up, adjust-down, or forward-step) the pixel filter 130 sends signals over bus 151 to multiplexor 132, 144, 156, 170 and 146 to select an appropriate input into, pixel filter 130 controls the adder/subtracter 145, 158, 166 and register 147; pixel filter 130 controls the adder/subtracter 145, 158 and 166, to perform either an addition or subtraction operation; pixel filter 130 sends signals to multiplexor 146 and incrementer/decrementer 149 to either increase or decrease the data in register 147 by one or not to modify the data. Barrel shifter 159 performs only a single bit right shift or left shift. Pixel filter 130 controls the direction of shifting on barrel shifter 159 to perform either a right shift or a left shift operation. Barrel shifter 155 and 157 perform only right shift operation. The data in register 147 determines the number of bits to be shifted by barrel shifters 155, 157. The data in register 162 is input to barrel shifter 155 which right shifts the data by the number of bits specified in register 147 and outputs the data to multiplexor 170. Similarly, barrel shifter 157 receives input data from register 150 and produces a right shifted output to multiplexor 156.

To perform an adjust-down transformation, the new coefficients are adjusted to be:

$$a'=a>>1$$

$$b'=b-(a>>1)$$

$$c'=c-((b-(a>>1))>>(n+2))$$

$$d'=d$$

$$n'=n+1$$

The new coefficients are obtained in three clock cycles as follows: First clock cycle, pixel filter 130 places control signals on bus 151 which causes incrementer/decrementer 149 to increase the data in register 147 by one, barrel shifter 159 to right shift by one bit, and multiplexor 132 to select an input from barrel shifter 159. At the end of this clock cycle, the result is $n'=n+1$ and $a'=a>>1$. During the second clock cycle, pixel filter 130 places control signals on bus 151 which causes incrementer/decrementer 149 to increase the data in register 147 by one, multiplexor 144 to select an input from register 134 and adder/subtracter 145 to perform a subtraction. At the end of the second clock cycle, the result of two clock operations is:

$$n'=n+2$$

$$a'=a>>1$$

$$b'=b-(a>>1)$$

During the third clock cycle, pixel filter 130 places control signals on bus 151 which causes multiplexor 156 to select an input from barrel shifter 157 to perform a right shift, adder/subtracter 158 to perform a subtraction, and incrementer/decrementer 149 to decrease the data in register 147 by one. The results of the three clock operation is:

$$a'=a>>1$$

$$b'=b-(a>>1)$$

$$c'=c-((b-(a>>1))>>(n+2))$$

$$d'=d$$

$$n'=n+1.$$

Similarly, as previously discussed, when the pixel increment calculated by the X AFDU circuit 112 and the Y AFDU circuit 114 are both less than 0.5 of a pixel step, an adjust-up transformation is performed and the coefficients a, b, c, and d are transformed by:

$$c'=c+(b>>(n+1))$$

$$b'=b+a$$

$$a'=a<<1$$

$$d'=d$$

$$n'=n-1$$

To perform an adjust-up transformation, the new coefficients are obtained in three clock cycles as follows:

During the first clock cycle, pixel filter 130 places control signals on bus 151 which causes incrementer/decrementer 149 to increase the data in register 147 by one, resulting in the operation $n'=n+1$. During the second clock cycle, pixel filter 130 places control signals on bus 151 which causes multiplexor 156 to select an input from barrel shifter 157, barrel shifter 157 to perform a right shift, adder/subtracter 158 to perform an addition, multiplexor 144 to select an input from register 134, add/subtracter 145 to perform an addition, and incrementer/decrementer 149 to decrease the data in register 147 by one which results, at the end of two clock cycles in the operations:

$$b'=b+a$$

$$c'=c+(b>>(n+1))$$

$$n'=n.$$

During the third clock cycle, pixel filter 130 places control signals on bus 151 which causes barrel shifter 159 to perform a single bit left shift, multiplexor 132 to select an input from barrel shifter 159, and incrementer/decrementer 149 to decrease the data in register 147 by one. Thus the resulting operations at the end of this clock cycle are:

$$a'=a<<1$$

$$b'=b+a$$

$$c'=c+(b>>(n+1))$$

$$n'=n-1.$$

Alternately, if the AFDU circuit calculates an X increment between 0.5 and 1 and a Y increment between 0.5 and 1 then the a, b, c, and d coefficients are transformed with the forward-step transformation:

$$d'=d+(c>>n)$$

$$c'=c+(b>>n)$$

$$b'=b+a$$

$$a'=a$$

A forward-step transformation is performed in one clock cycle as follows: Pixel filter 130 places control signals on bus 151 which causes multiplexor 132 to select an input from register 134, multiplexor 144 to select an input from register 134, multiplexor 156 to select an input from barrel shifter 157, multiplexor 170 to select an input from barrel shifter 155, barrel shifter 155 and 157 to perform a right shift, and add/subtracter 145, 158, and 166 to perform an addition. The result at the end of the clock cycle is:

$$d'=d+(c>>n)$$

$$c'=c+(b>>n)$$

$$b'=b+a.$$

It can be appreciated that only the outputs from AFDU circuits X, Y, and W are used by the pixel filter to control the adjustment of all four AFDU circuits since the x/w and y/w coordinates sufficiently define pixel location. In such a fashion, the AFDU circuits 110, 112 and 114, in cooperation with the 1/w circuit 118, multipliers 120, 122, 124 and pixel filter 130, ensure that the curves rendered are incremented in substantially one pixel increments.

Memory buffers 148, 160, and 168 are used to store a sequence of the previous b, c and d values, respectively, so that the properly delayed coordinate values associated with the pixel filter 130 control signal are used. This is necessary because pixel filter 130 determines control decisions several clocks after the AFDU generates the pixel addresses. Memory buffers 148, 160 and 168 store a sequence of values having a delay equal to the number of clocks between the AFDU and the pixel filter. No memory buffer is necessary for register 134 since "a" does not change during a forward step operation.

Figure 8:
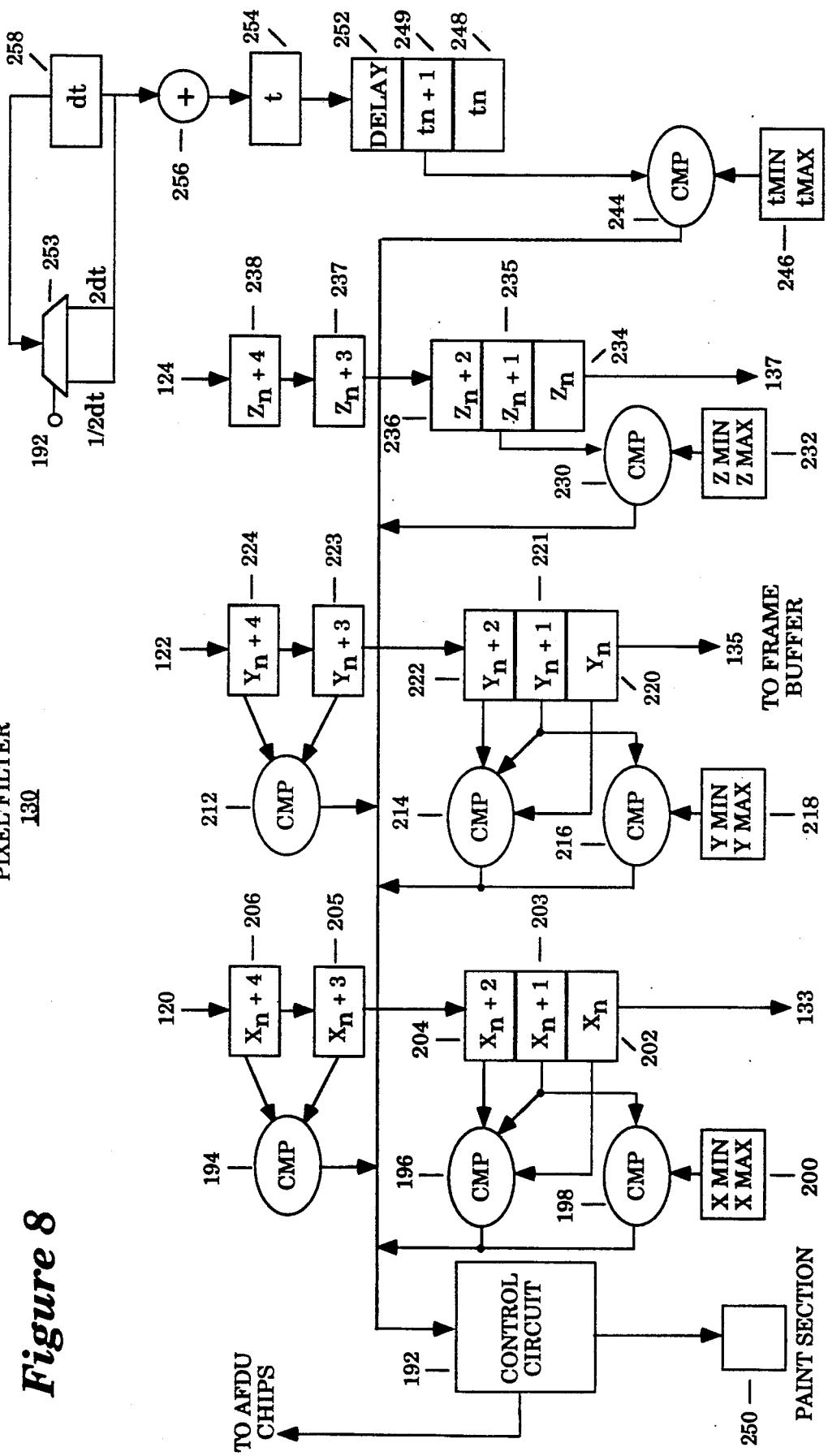
FIG. 8 illustrates the pixel filter utilized with the preferred embodiment of the present invention shown in FIG. 6.

Referring to FIG. 8, the pixel filter will now be discussed. Registers 202, 203, 204, 205 and 206 of FIG. 8 store coordinate values $x_n$ to $x_{n+4}$ which are outputs supplied by X AFDU circuit 112 and multiplied by 1/W by multiplier 120 (of FIG. 6) in the five previous clock cycles. Similarly, y registers 220, 212, 222, 223 and 224 store y values $y_n$ to $y_{n+4}$. Likewise, registers 234, 235, 236, 237 and 238 store z values $z_n$ to $z_{n+4}$.

Register 202-206 store, sequentially, each x coordinate supplied thereto by the X AFDU circuit 112 and multiplier 120 such that $x_{n+4}$ is the most recently calculated coordinate. At each clock cycle comparator 194 compares the value $x_{n+3}$ in register 205 with $x_{n+4}$ in register 206, and comparator 212 compares the value $y_{n+3}$ in register 223 with $y_{n+4}$ in register 224. If the absolute value of $x_{n+4}-x_{n+3}$ and the absolute value of $y_{n+4}-y_{n+3}$ are both less than 0.5 of a single pixel increment, the controller 192 sends a control signal to all four AFDU circuits instructing the same to increase the step size (adjust-up) as previously described with respect to FIGS. 6 and 7. If the absolute value of $x_{n+4}-x_{n+3}$ is greater than one pixel increment or the absolute value of $y_{n+4}-y_{n+3}$ is greater than one pixel increment, the controller then asserts a control signal to all four AFDU circuits which instruct the same to decrease the step size (adjust-down).

Values $z_{n+4}$ and $z_{n+3}$ stored in registers 238 and 237 are not used to determine whether or not the step size should be adjusted upwardly or downwardly because the x and y coordinates sufficiently define a pixel location on a CRT display. However, registers 238 and 237 function as delay buffers so that values $z_{n+2}$, $z_{n+1}$ and $z_n$ (which are stored, respectively, in registers 236-234) will correspond to the values of $y_{n+2}$, $y_{n+1}$ and $y_n$ (stored in, respectively 222, 221 and 220) and to the values of $x_{n+2}$, $x_{n+1}$ and $x_n$ (stored in registers 204, 203 and 202).

Alternatively, if the absolute value of $x_{n+4}-x_{n+3}$ and the absolute value of $y_{n+4}-y_{n+3}$ are both between 0.5 and 1.0 pixel units, then the comparators 194 and 212 instruct control circuit 192 to instruct all four AFDU circuits to perform a forward step operation as previously described.

It is important to note that all four AFDU circuits 110, 112, 114 and 116 of FIG. 4 are adjusted upwardly, downwardly, or forwardly in synchronicity by pixel filter 130.

In order to eliminate redundant pixels in a displayed image, comparator 196 compares the integer part of the value $x_{n+2}$ which is stored in register 204, with the integer part of the $x_{n+1}$ value stored in register 203. Comparator 214 then compares the integer part of the value $y_{n+2}$ in register 222 with the integer part of the value $y_{n+1}$ in register 221. If the integer parts $x_{n+2}=x_{n+1}$ and $y_{n+2}=y_{n+1}$, comparators 196 and 214 assert signals at control circuit 192 which, in turn, output an invalid pixel bit to paint section 250, such that paint section 250 invalidates the display of the pixel with the coordinates corresponding to $x_{n+1}$ and $y_{n+1}$.

It will be appreciated that the above-described invention may be embodied in other specific forms without departing from the spirit or essential characteristics thereof. The present embodiments are, therefore, to be considered in all aspects as illustrative and not restrictive, the scope of the invention being indicated by the appended claims rather than by the foregoing description, and all changes which come within the meaning and range of equivalency are, therefore, intended to be embraced therein.

I claim:

1. An apparatus for rendering a parametric function using adaptive forward differencing and integer arithmetic wherein the output of the parametric function rendered comprises a plurality of output values which are within a range of valid output values identified by a predetermined heuristic function, said output values calculated in predetermined increments according to a parameter value incremented by an amount equal to a parametric step size, wherein the parameter value is equal to the sum of a prior parameter value used to calculate a prior output value and the parametric step size, said output values being calculated to be within the range of valid output values by adjusting the parametric step size, said apparatus comprising:

receiving means for receiving an initial parameter value and initial parametric step size and the parametric function to be rendered, wherein said initial parameter value is used to initialize the prior parameter value and said initial parametric step size is used to initialize the parametric step size;

translating means connected to the receiving means for translating the parametric function according to the parameter value, said parameter value equal to the sum of the parametric step size and the prior parameter value, into a forward difference basis comprising forward difference coefficients, each forward difference coefficient corresponding to a different order derivative of the parametric function such that a first forward difference coefficient corresponds to the value of the parametric function, a second forward difference coefficient corresponds to a first order derivative of the parametric function and succeeding forward difference coefficients respectively correspond to succeeding order derivatives of the parametric function;

a plurality of registers connected to the translating means for storing each of the forward difference coefficients;

register control means for controlling the format of the forward difference coefficients stored in the plurality of registers, the first forward difference coefficient being stored in a first format having a fixed predetermined number of fractional bits, and succeeding forward difference coefficients being stored in formats having a number of fractional bits equal to the fixed predetermined number of fractional bits plus a number of guard bits equal to a tessellation number multiplied by a multiplication factor, said multiplication factor having a value of zero for the first forward difference coefficient and incremented by one for each succeeding forward difference coefficient, the highest order coefficient retaining the same multiplication factor as the preceding lower order coefficient;

calculating means connected to the plurality of registers for calculating a result of the parametric function for the parameter value using the forward difference basis comprising the forward difference coefficients;

a comparator connected to the calculating means and the register control means for comparing the result output by the calculating means to the range of valid output values identified by the heuristic function to determine whether to adjust the parameter increment up, down or to advance by an amount equal to the current parametric step size to calculate the next result of the parametric function;

if the result output by the calculating means is less than the range of valid output values, said comparator outputting a first signal to the register control means and translating means to increase the parametric step size, said register control means decreasing the number of guard bits in the succeeding registers by decreasing the tessellation number by a predetermined adjustment value;

if the result output by the calculating means is greater than the range of valid output values, said comparator outputting a second signal to the register control means to decrease the parametric step size, said register control means increasing the number of guard bits in the succeeding registers by increasing the tessellation number by the predetermined adjustment value;

if the result output by the calculating means is within the range of valid output values, said comparator outputting a third signal to said calculating means to output the result as an output value, and to said translating means to advance to the calculation of the next output value by updating the prior parameter value to be the parameter value used to calculate the result output as an output value and updating the parameter value to be equal to the sum of the prior parameter value and the parametric step size and to update the forward difference coefficients stored in the registers according to the updated parameter value;

whereby the parametric function is rendered for a plurality of parameter values within a range of parameter values and the first forward difference coefficient consistently maintains the fixed predetermined number of fractional bits resulting in increased precision.

2. The apparatus of claim 1 wherein the heuristic function comprises calculating the results output by the calculating means to be substantially uniform increments.

3. The apparatus of claim 1 wherein said apparatus is used to generate curves for display on a computer graphic display device, said curves represented by parametric functions, said computer graphic display device comprising a matrix of pixels, said curves displayed on the graphic display device by actuating certain of the pixels, said certain pixels to be actuated identified by pixel data comprising coordinate values which correspond to locations in the matrix of pixels, said apparatus further comprising:
a frame buffer connected to the calculating means for receiving and storing pixel data, said pixel data comprising the results output by the calculating means, the results output by the calculating means comprising coordinate values which correspond to locations in the matrix of pixels; and
a graphic display control device connected to the frame buffer and the computer graphics display device to read the pixel data and actuate the pixels at the locations identified by the coordinate values of the pixel data;

wherein the heuristic function comprises calculating the results of the parametric function output by the calculating means to be coordinate values in a sequence of approximately one pixel increments.

4. The apparatus of claim 1 wherein the predetermined number of fractional bits is equal to 16.

5. The apparatus of claim 1 wherein the register control means controls the format of the forward difference coefficients such that one-half of the total number of bits stored of the first forward difference coefficient are fractional bits.

6. The apparatus of claim 1 where the predetermined number of guard bits is equal to two, and the number of guard bits in the succeeding forward difference coefficients are incremental values of two.

7. The apparatus of claim 1 wherein the parametric function is a third order polynomial function.

8. The apparatus of claim 7 wherein the translating means translates the parametric function into a forward difference basis comprising four forward difference coefficients.

9. The apparatus of claim 8 wherein said register control means:
stores the first forward difference coefficient in a first register of the plurality of registers in such a format that one-half of the total number of bits representing the first forward difference coefficient are fractional bits;
stores the second forward difference coefficient in a second register of the plurality of registers in such a format that one-half of the total number of bits representing the second forward difference coefficient plus the predetermined number of guard bits equal to the tessellation number are fractional bits;
stores the third forward difference coefficient in a third register of the plurality of registers in such a format that one-half of the total number of bits representing the third forward difference coefficient plus guard bits equal to the tessellation number multiplied by two are fractional bits; and
stores the fourth forward difference coefficient in a fourth register of the plurality of registers in such a format that one-half of the total number of bits representing the fourth forward difference coefficient plus guard bits equal to the tessellation number multiplied by two are fractional bits.

10. The apparatus of claim 9 wherein the calculating means for calculating the result of the parametric function comprises means for calculating the value to be equal to the output in the first register.

11. The apparatus of claim 9 wherein the translating means and register control means increase the parametric step size by respectively updating the forward difference coefficients and format of the forward difference coefficients stored in the plurality of registers according to the following equations:

$$d' = d;$$

$$c' = c + (b >> (n+1));$$

$$b' = b + a;$$

$$a' = a << 1; \text{ and}$$

$$n' = n - 1$$

wherein d represents the first forward difference coefficient, c, b and a respectively represent the second, third and fourth forward difference coefficients, n represents the tessellation number;

whereby the number of guard bits in the second forward difference register is decreased by one, in the third forward difference register by two and in the fourth forward difference register by two.

12. The apparatus of claim 9 wherein the translating means and register control means decrease the parametric step size by respectively updating the forward difference coefficients and format of the forward difference coefficients stored in the plurality of registers according to the following equations:

$$a' = a >> 1;$$

$$b' = b - a';$$

$$c'32\ c - (b' >> (n+2));$$

$$d' = d;\ \text{and}$$

$$n' = n + 1$$

wherein d represents the first forward difference coefficient, c, b and a respectively represent the second, third and fourth forward difference coefficients, and n represents the tessellation number; and wherein the number of guard bits in the second forward difference register is increased by one, in the third forward difference register by two and in the fourth forward difference register by two.

13. The apparatus of claim 9 wherein the translating means and register control means advance to the calculation of the next result by respectively updating the forward difference coefficients and format of the forward difference coefficients stored in the plurality of registers according to the following equations:

$$d' = d + (c >> n);$$

$$c' = c + (b >> n);$$

$$b' = b + a;$$

wherein d represents the first forward difference coefficient, c, b and a respectively represent the second, third and fourth forward difference coefficients.

14. The apparatus of claim 1 wherein the predetermined adjustment value is equal to a value of 1.

15. An adaptive forward differencing apparatus for generating curves for display on a computer graphic display device, said apparatus comprising a central processing unit (CPU), memory, and input/out means comprising the computer graphics display device, said computer graphics display device comprising a matrix of pixels, said curves displayed on the computer graphics display device by actuating certain of the pixels, said certain pixels to be actuated being identified by pixel data comprising sets of coordinate values which identify locations of pixels in the matrix, said apparatus further comprising:

means for receiving a plurality of data values representative of said pixels to be activated to generate the curve;

interpreting means connected to the receiving means for interpreting said data values and representing said curve as a set of parametric functions, each parametric function representative of a coordinate value of the set of coordinate values;

forward difference means connected to the interpreting means to calculate the output of the parametric functions for a range of parameter values, said output of the forward difference means comprising a plurality of results, said results comprising sets of coordinate values which identify locations of pixels in the matrix, said results calculated on an incremental basis wherein a parameter value is equal to the sum of a prior parameter value, said prior parameter value being the parameter value used to calculate a prior adjacent set of coordinate values, and the parametric step size comprising;

translating means for translating each parametric function according to the parameter value, said parameter value equal to the sum of the parametric step size and the prior parameter value, into a forward difference basis comprising forward difference coefficients, each forward difference coefficient corresponding to a different order derivative of each parametric function such that a first forward difference coefficient corresponds to the value of the parametric function, a parametric function such that a first forward difference coefficient corresponds to the value of the parametric function, a second forward difference coefficient corresponds to a first order derivative of the parametric function and succeeding forward difference coefficients respectively correspond to succeeding order derivatives of the parametric function;

a plurality of registers connected to the translating means for storing each of the forward difference coefficients of each parametric function;

register control means for controlling the format of the forward difference coefficients stored in the plurality of registers, the first forward difference coefficient of each parametric function being stored in a first format having a fixed predetermined number of fractional bits, and succeeding forward difference coefficients being stored in formats having a number of fractional bits equal to the fixed predetermined number of fractional bits plus a number of guard bits, said number of guard bits being equal to a tessellation number multiplied by a multiplication factor, said multiplication factor having a value zero for the first forward difference coefficient and incremented by one for each succeeding forward difference coefficient, the highest order coefficient retaining the same multiplication factor as the preceding lower order coefficient;

calculating means connected to the plurality of registers for calculating a result of each parametric function for a predetermined parameter value using the forward difference basis comprising the forward difference coefficients, each result representing a coordinate value of the set of coordinate values;

adjusting means for modifying the parametric step size;

a frame buffer for receiving and storing pixel data; and a pixel filter connected to the forward difference means and the frame buffer comprising an input means connected to the forward difference means to receive a set of coordinate values output by the forward difference means, a first output means connected to the forward difference means to input control signals to control the parametric step size and the set of coordinate values computed, and a second output means for outputing pixel data to the frame buffer, said pixel filter comprising;

means for comparing a first set of coordinate values to an adjacent second set of coordinate values, said first set of coordinate values being the prior adjacent set of coordinate values output to the frame buffer;

if the value of the difference between the first set of coordinate values and the second set of coordinate values is greater than a range of difference values acceptable as a uniform increment, a first control signal, output by the first output means to the forward difference means, to increase the parametric step size and re-compute coordinate values of the second set of coordinates using a parameter value equal to the sum of the parameter value used to compute the first set of coordinate values and the increased parametric step size, said register control means increasing the number of guard bits in the succeeding registers by decreasing the tessellation number by a value of one; and if the value of the difference between the first set of coordinate values and the adjacent second set of coordinate values is less than the range of difference values accepted as a uniform increment, a second control signal, output by said first output means to the forward difference means, to decreas the parametric step size and re-compute coordinate values of the second set of coordinates using a parameter value equal to the sum of the parameter value used to compute the first set of coordinate values and the decreased parametric step size; and if the value of the difference between the first set of coordinate values and the adjacent second set of coordinate values is within the range of difference values acceptable as a uniform increment, means for performing a forward step operation along the curve comprising, said second output means outputing pixel data comprising the second set of coordinate values to the frame buffer; and a third control signal output by said first output means to the forward difference means to set the prior parameter value to be the parameter value used to compute the second set of coordinate values and to compute coordinate values of a next set of coordinates adjacent to the second set of coordinates using a parameter value equal to the sum of the prior parameter value and the parametric step size, and setting the second set of coordinates to be the first set of coordinates and the next set of coordinates to be the second set of coordinates;

a graphic display control device connected to the frame buffer and the graphics display device to read the pixel data from the frame buffer and actuate the pixels on the display device at the locations identified by the pixel data;

wherein the pixels actuated on the computer graphics display device to generate a curve are spaced apart by uniform increments.

16. The apparatus of claim 15 wherein the predetermined adjustment value is equal to a value of 1.

17. In a system for rendering a parametric function, a method for rendering the parametric function using adaptive forward differencing and integer arithmetic, wherein the output values of the parametric function comprise a plurality of results which are within a range of valid output values identified by a predetermined heuristic function, said output values calculated in predetermined increments according to a parameter value, said parameter value incremented by an amount equal to a parametric step size wherein the parameter value is equal to the sum of a prior parameter value used to calculate a prior output value and the parametric step size, said results being calculated in predetermined increments by adjusting the parametric step size, said method comprising the steps of:

translating the parametric function into a forward difference basis comprising forward difference coefficients, each forward difference coefficient corresponding to a different order derivative of the parametric function such that a first forward difference coefficient corresponds to the value of the parametric function, a second forward difference coefficient corresponds to a first order derivative of the parametric function and succeeding forward difference coefficients correspond to succeeding order derivatives of the parametric function;

storing the forward difference coefficients in plurality of registers;

controlling the format of the forward difference coefficients stored in the plurality of registers, the first forward difference coefficient being stored in a first format having a fixed predetermined number of fractional bits and succeeding forward difference coefficients being stored in formats having a number of fractional bits equal to the fixed predetermined number of fractional bits plus a number of guard bits equal to the tessellation number multiplied by a multiplication factor, said multiplication factor being zero for the first forward difference coefficient and incremented by one for each succeeding forward difference coefficient, the highest order coefficient retaining the same multiplication factor value as the preceding lower order coefficient;

calculating a result of the fixed parametric function for a parameter value using the forward difference basis comprising the forward difference coefficients stored in the plurality of registers;

comparing the result with the heuristic function to determine if the result is within the range of valid output values;

if the result is less than the range of valid output values, increasing the parametric step size by decreasing the number of guard bits in the registers by increasing the tessellation number by a predetermined adjustment value and recalculating a result of the parametric function according to an adjusted parameter value equal to the sum of the prior parameter value and the increased parametric step size;

if the result is greater than the range of value output values, decreasing the parametric step size by increasing the number of guard bits in the registers by decreasing the tessellation number by the predetermined adjustment value and recalculating a result of the parametric function according to an adjusted parameter value equal to the sum of the prior parameter value and the decreased parametric step size;

if the result is within the range of valid output values, outputting the result as an output value of the parametric function and advancing to the calculation of the next output value by setting the prior parameter value to be equal to the parameter value used to calculate the result output as an output value, updating the parameter value to be equal to the sum of the prior parameter value and the parametric step size and updating the forward difference coefficients stored in the registers according to the updated parameter value;

whereby the parametric function is rendered for a plurality of parameter values within a range of parameter values and the first coefficient consistently maintains the fixed predetermined number of fractional bits resulting in increased precision of the results calculated.

18. The method of claim 17 wherein the heuristic function comprises calculating the output values of the parametric function in substantially uniform increments.

19. The method of claim 17 wherein the system is a device for the rendering of curves for display on a computer graphics device, said curves represented by parametric functions, said computer graphics display device comprising a matrix of pixels, said curves displayed on the computer graphic display device by activating certain of the pixels, said certain pixels to be activated identified by pixel data comprising coordinate values which correspond to locations in the matrix of pixels, the results calculated comprising coordinate values and the heuristic function comprises calculating the coordinate values in approximately one pixel increments.

20. The method of claim 17 wherein the predetermined number of fractional bits is equal to 16.

21. The method of claim 17 wherein the first forward difference coefficient is stored in such a manner that one-half of the total number of bits are fractional bits.

22. The method of claim 17 where the number of guard bits in the succeeding forward difference coefficients are one half of the total number of bits plus guard bits equal to an incremental amount of the tessellation number.

23. The methods of claim 17 wherein the parametric function is a third order polynomial function.

24. The method of claim 23 wherein the step of translating the parametric function results in a forward difference basis comprising four forward difference coefficients.

25. The method of claim 24 wherein the step of controlling the format of the forward difference coefficients controls:

the first forward difference coefficient to be stored in a first register of the plurality of registers in such a format that one-half of the total number of bits representing the first forward difference coefficient are fractional bits;

the second forward difference coefficient to be stored in a second register of the plurality of registers in such a format that one-half of the total number of bits representing the second forward difference coefficient plus a number of guard bits equal to the tessellation number are fractional bits;

the third forward difference to be stored in a third register of the plurality of registers in coefficient such a format that one-half of the total number of bits representing the third forward difference coefficient plus a number of guard bits equal to two multiplied by the tessellation number are fractional bits; and the fourth forward difference coefficient in a fourth register of the plurality of registers in such a format that one-half of the total number of bits representing the fourth forward difference coefficient plus a number of guard bits equal to two multiplied by the tessellation number are fractional bits.

26. The method of claim 25 wherein the step of calculating the result of the parametric function comprises calculating the value to be equal to the output in the first forward difference register.

27. The method of claim 25 wherein the step of increasing the parametric step size and recalculating the result comprises adjusting up the parameter increment comprises the steps of:

adjusting the forward difference coefficients and format of the forward difference coefficients stored in the plurality of registers according to the following equations;

$d' = d;$ $c' = c + (b >> (n+1));$ $b' = b + a;$ $a' = a << 1;$ and $n' = n - 1$ wherein d represents the first forward difference coefficient, c, b and a respectively represent the second, third and fourth forward difference coefficients, and n is the tessellation number;

whereby the number of guard bits in the second forward difference register is decreased by one, in the third forward difference register by two and in the fourth forward difference register by two.

28. The apparatus of claim 25 wherein the step decreasing the parametric step size and recalculating the result comprises the steps of:

adjusting the forward difference coefficients and format of the forward difference coefficients stored in the plurality of registers according to the following equations;

$a' = a >> 1;$ $b' = b - a';$ $c' = c - (b' >> (n+2));$ $d' = d;$ and $n' = n + 1$ wherein d represents the first forward difference coefficient, c, b and a respectively represent the second, third and fourth forward difference coefficients and n is the tessellation number;

whereby the number of guard bits in the second forward difference register is increased by one, in the third forward difference register by two and in the fourth forward difference register by two.

29. The method of claim 25 wherein the step of advancing by updating the parameter value and forward difference coefficients comprises:

updating the forward difference coefficients and format of the forward difference coefficients stored in the plurality of registers according to the following equations:

$d' = d + (c >> n);$ $c' = c + (b >> n);$ $b' = b + a.$ wherein d represents the first forward difference coefficient, c, b and a respectively represent the second, third and fourth forward difference coefficients and n is the tessellation number;

30. An apparatus for rendering a third order polynomial parametric function using adaptive forward differencing and integer arithmetic, said third order polynomial parametric function being of the form: $f(t) = At^3 + Bt^2 + Ct + D$, wherein the output of the parametric function rendered comprises a plurality of output values which are rendered in uniform increments, said output values calculated in uniform increments according to a parameter value incremented by an amount equal to a parametric step size, wherein the parameter value is equal to the sum of a prior parameter value used to calculate a prior output value and the parametric step size, said output values being calculated to be rendered in uniform increments by adjusting the parametric step size, said apparatus comprising:

receiving means for receiving an initial parameter value and parametric step size and the parametric function to be rendered, wherein said initial parameter value is used to initialize the prior parameter value and said initial parametric step size is used to initialize the parametric step size;

translating means connected to the receiving means for translating the parametric function according to the parameter value, said parameter value equal to the sum of the parametric step size and the prior parameter value, into a forward difference basis comprising forward difference coefficients according to the following equations:

$d = D;$ $c = C + ((B + (A >> n)) >> n);$ $b = 2B + (6A >> n);$ $a = 6A >> n;$ wherein each forward difference coefficient corresponds to a different order derivative of the parametric function, d represents a first forward difference coefficient corresponding to the value of the parametric function, c represents the second forward difference coefficient corresponding to the first order derivative of the parametric function, b represents a third forward difference coefficient corresponding to the second order derivative of the parametric function, a represents a fourth forward difference coefficient corresponding to the third order derivative of the parametric function, n represents a tessellation number and $>>$ represent a right shift of n bits, a plurality of registers connected to the translating means for storing each of the forward difference coefficients;

register control means for controlling the format of the forward difference coefficients stored in the plurality of registers, the first forward difference coefficient being stored in a first format having a fixed predetermined number of fractional bits, and succeeding forward difference coefficients being stored in formats having a number of fractional bits equal to the fixed predetermined number of fractional bits plus a number of guard bits equal to the tessellation number multiplied by a multiplication factor, said multiplication having a value of zero for the first forward difference coefficient and incremented by one for each succeeding forward difference coefficient, the highest order coefficient retaining the same multiplication factor as the preceding lower order coefficient, whereby the first forward difference coefficient is stored having 16 fractional bits, the second forward difference coefficient is stored having 16+n fractional bits, where n is the tessellation number, and the third and fourth forward difference coefficients are stored having 16+2n fractional bits;

calculating means connected to the plurality of registers for calculating a result of the parametric function for the parameter value using the forward difference basis comprising the forward difference coefficients;

a comparator connected to the calculating means for comparing a prior output value to the result output by the calculating means;

if the value of the difference between the prior output value and the result is greater than a range of difference values acceptable as a uniform increment, a first control signal, output by the first output means to the translating means and register control means, to increase the parametric step size and re-compute the result using a parameter value equal to the sum of the prior parameter value and the increased parametric step size, by respectively updating the forward difference coefficients and format of the forward difference coefficients stored in the plurality of registers according to the following equations:

$a' = a >> 1;$ $b' = b - a';$ $c' = c - (b >> (n+2));$ $d' = d;$ and $n' = n + 1$ wherein d' represents the updated first forward difference coefficient, c', b' and a respectively represent the updated second, third and fourth forward difference coefficients, and n' represents the updated tessellation number, and the number of guard bits in the second forward difference register is increased by one, in the third forward difference register by two and in the fourth forward difference register by two;

if the value of the difference between the prior output value and the result is less than the range of difference values accepted as a uniform increment, a second control signal, output by said first output means to the translating means and register control means, to decrease the parametric step size and re-compute coordinate values of the second set of coordinates using a parameter value equal to the sum of the prior parameter value and the decreased parametric step size, by respectively updating the forward difference coefficients and format of the forward difference coefficients stored in the plurality of registers according to the following equations:

$d' = d;$ $c' = c + (b >> (n+1));$ $b' = b + a;$ $a' = a << 1;$ and $n' = n - 1$ whereby the number of guard bits in the second forward difference register is decreased by one, in the third forward difference register by two and in the fourth forward difference register by two;

if the value of the difference between the prior output value and the result is within the range of difference values acceptable as a uniform increment, means for advancing to the calculation of the next output value by performing a forward step operation comprising, said second output means outputing the result as an output value; and a third control signal output by said first output means to the translating means, register control means and comparator to set the prior output value to be the result output as an output value and the prior parameter value to be the parameter value used to calculate the result output as an output value, and to compute a next output valve a uniform increment difference in value to the result output as an output value, said next output value corrupted using a parameter value equal to the sum of the prior parameter value and the parametric step size, whereby the result determined using the parameter value equal to the sum of the prior parameter value and the parametric step size is compared to the prior output value to determine the next output value, said translating means and register control means respectively updating the forward difference coefficients and format of the forward difference coefficients stored in the plurality of registers according to the following equations;

$d' = d + (c >> n);$ $c' = c + (b >> n);$ $b' = b + a;$ whereby the first forward difference coefficient consistently has the fixed predetermined number of fractional bits with increased precision due to the use of guard bits with respect to the succeeding forward difference coefficients.

* * * * *

UNITED STATES PATENT AND TRADEMARK OFFICE
CERTIFICATE OF CORRECTION

PATENT NO.   : 5,179,647
DATED        : January 12, 1993
INVENTOR(S)  : Chang

It is certified that error appears in the above-identified patent and that said Letters Patent is hereby corrected as shown below:

In column 18 at line 16, please delete " a parametric function such that a first forward difference coefficient corresponds to the value of the parametric function, ".

Signed and Sealed this

Sixteenth Day of September, 1997

Attest:

BRUCE LEHMAN

*Attesting Officer*         *Commissioner of Patents and Trademarks*